United States Patent
Sato

[11] Patent Number: 5,365,471
[45] Date of Patent: Nov. 15, 1994

[54] DIVIDER FOR PERFORMING SIGNED DIVISION USING A REDUNDANT SIGNED DIGIT

[75] Inventor: Fumiki Sato, Hyogo, Japan

[73] Assignee: Mitsubishi Denki Kabushiki Kaisha, Tokyo, Japan

[21] Appl. No.: 926,871

[22] Filed: Aug. 7, 1992

[30] Foreign Application Priority Data

Aug. 8, 1991 [JP] Japan .................................. 3-223501

[51] Int. Cl.$^5$ .............................................. G06F 7/52
[52] U.S. Cl. .................................. 364/746.2; 364/764
[58] Field of Search ..................... 364/746.2, 761, 764

[56] References Cited

U.S. PATENT DOCUMENTS

| | | | |
|---|---|---|---|
| 4,873,660 | 10/1989 | Nishiyama et al. | 364/746.2 |
| 4,878,192 | 10/1989 | Nishiyama et al. | 364/746.2 |
| 4,935,892 | 6/1990 | Nishiyama et al. | 364/746.2 |
| 5,153,847 | 10/1992 | Takagi et al. | 364/746.2 |

*Primary Examiner*—David H. Malzahn

[57] ABSTRACT

A divider having a selector for selecting a numeral to be added to a dividend or partial remainder by an adder, which makes it possible to receive the numeral with a divisor reversing means, input the numeral to the selector by reversing all bits of a divisor when the sign of the divisor is negative, use a quotient digit determined by a quotient digit determining means as a selection signal for controlling the selector, and decrease the number of stages of transistors necessary to obtain the selection signal.

4 Claims, 11 Drawing Sheets

| X | Y | Z | Q2 | Q1 |
|---|---|---|----|----|
| 1 | 1 | 1 | 1  | 1  |
| 1 | 1 | 0 | 0  | 0  |
| 1 | 0 | 1 | 0  | 0  |
| 1 | 0 | 0 | 0  | 1  |
| 0 | 1 | 1 | 1  | 0  |
| 0 | 1 | 0 | 1  | 1  |
| 0 | 0 | 1 | 1  | 1  |
| 0 | 0 | 0 | 0  | 0  |

FIG. 7

| FOR D>0 | | | |
|---|---|---|---|
| $r_0$ | $r_1$ | $r_2$ | $q_j$ |
| 1 | 0 | 1 | 1 |
| 1 | 0 | 0 | 1 |
| 1 | 0 | $\bar{1}$ | 1 |
| 1 | $\bar{1}$ | 1 | 1 |
| 1 | $\bar{1}$ | 0 | 1 |
| 1 | $\bar{1}$ | $\bar{1}$ | 0 |
| 0 | 1 | 1 | 1 |
| 0 | 1 | 0 | 1 |
| 0 | 1 | $\bar{1}$ | 0 |
| 0 | 0 | 1 | 0 |
| 0 | 0 | 0 | 0 |
| 0 | 0 | $\bar{1}$ | $\bar{0}$ |
| 0 | $\bar{1}$ | 1 | $\bar{0}$ |
| 0 | $\bar{1}$ | 0 | $\bar{1}$ |
| 0 | $\bar{1}$ | $\bar{1}$ | $\bar{1}$ |
| $\bar{1}$ | 1 | 1 | $\bar{0}$ |
| $\bar{1}$ | 1 | 0 | $\bar{1}$ |
| $\bar{1}$ | 1 | $\bar{1}$ | $\bar{1}$ |
| $\bar{1}$ | 0 | 1 | $\bar{1}$ |
| $\bar{1}$ | 0 | 0 | $\bar{1}$ |
| $\bar{1}$ | 0 | $\bar{1}$ | $\bar{1}$ |

| FOR D<0 | | | |
|---|---|---|---|
| $r_0$ | $r_1$ | $r_2$ | $q_j$ |
| 1 | 0 | 1 | $\bar{1}$ |
| 1 | 0 | 0 | $\bar{1}$ |
| 1 | 0 | $\bar{1}$ | $\bar{1}$ |
| 1 | $\bar{1}$ | 1 | $\bar{1}$ |
| 1 | $\bar{1}$ | 0 | $\bar{1}$ |
| 1 | $\bar{1}$ | $\bar{1}$ | 0 |
| 0 | 1 | 1 | $\bar{1}$ |
| 0 | 1 | 0 | $\bar{1}$ |
| 0 | 1 | $\bar{1}$ | 0 |
| 0 | 0 | 1 | 0 |
| 0 | 0 | 0 | 0 |
| 0 | 0 | $\bar{1}$ | $\bar{0}$ |
| 0 | $\bar{1}$ | 1 | $\bar{0}$ |
| 0 | $\bar{1}$ | 0 | 1 |
| 0 | $\bar{1}$ | $\bar{1}$ | 1 |
| $\bar{1}$ | 1 | 1 | $\bar{0}$ |
| $\bar{1}$ | 1 | 0 | 1 |
| $\bar{1}$ | 1 | $\bar{1}$ | 1 |
| $\bar{1}$ | 0 | 1 | 1 |
| $\bar{1}$ | 0 | 0 | 1 |
| $\bar{1}$ | 0 | $\bar{1}$ | 1 |

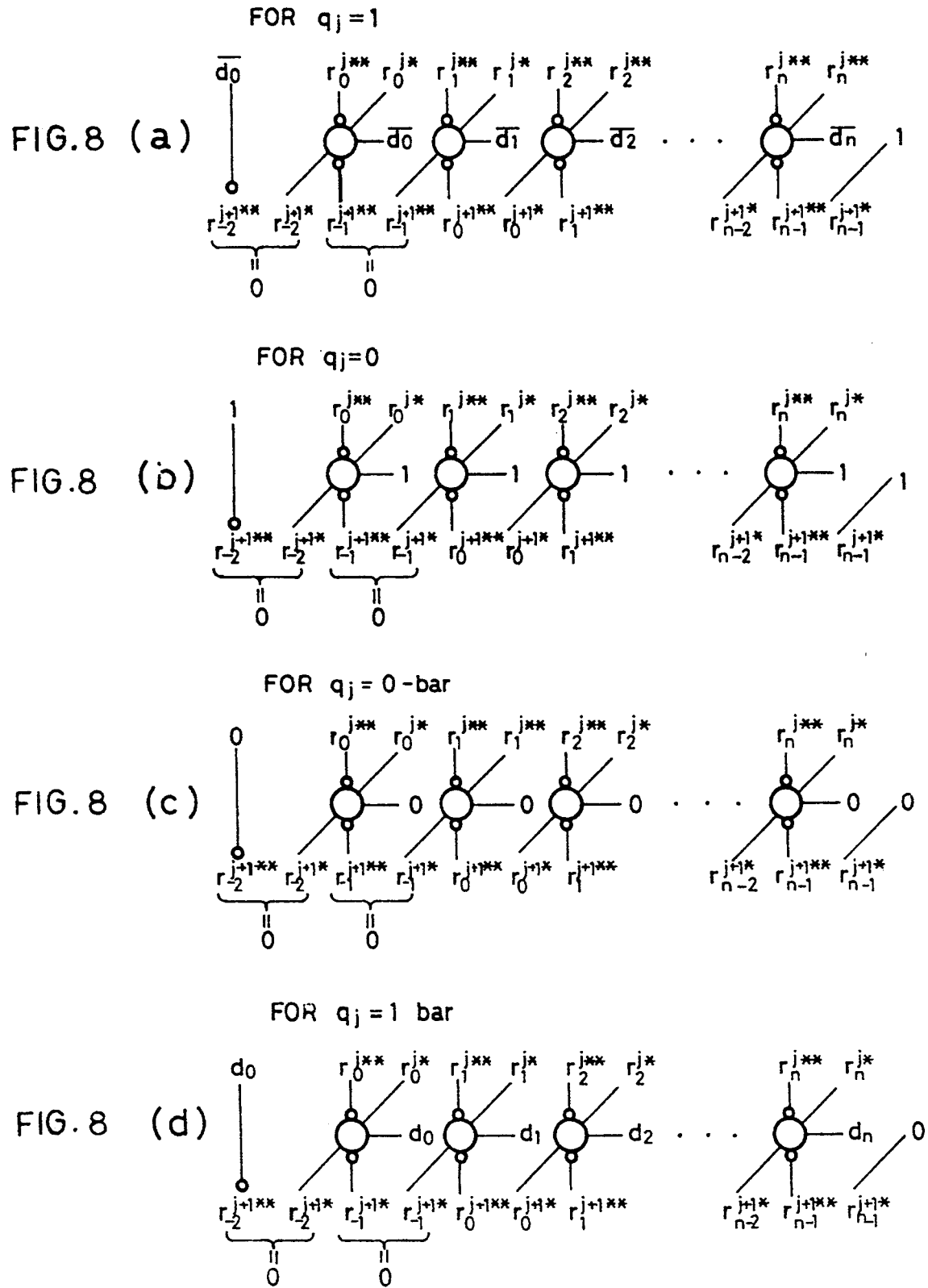

FIG.9
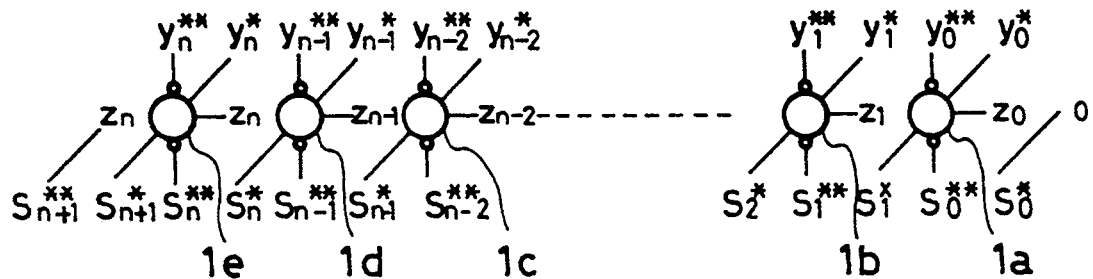
FIG.10
| $y_i^{**}$ | $y_i^*$ | $z_i$ | $s_{i+1}^*$ | $s_i^{**}$ |
|---|---|---|---|---|
| 1 | 1 | 1 | 1 | 1 |
| 1 | 1 | 0 | 0 | 0 |
| 1 | 0 | 1 | 0 | 0 |
| 1 | 0 | 0 | 0 | 1 |
| 0 | 1 | 1 | 1 | 0 |
| 0 | 1 | 0 | 1 | 1 |
| 0 | 0 | 1 | 1 | 1 |
| 0 | 0 | 0 | 0 | 0 |
FIG. 11
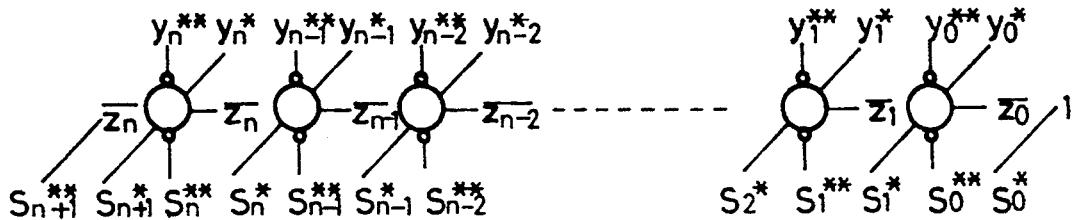

ADDITION $1\bar{1}\bar{1}100\bar{1}1\bar{1} = 93$

SUBSTRACTION $0010\bar{1}01\bar{1}1 = 51$

FIG.15

NUMERICAL VALUE INPUTTED FROM LOW ORDER OF ADDER, WHICH EQUALS $q_j^*$ WHEN ASSUMING THE FOLLOWING $q_j = 1 \rightarrow q_j^{**} = 0, \quad q_j^* = 1$ $q_j = 0 \rightarrow q_j^{**} = 1, \quad q_j^* = 1$ $q_j = \bar{0} \rightarrow q_j^{**} = 0, \quad q_j^* = 0$ $q_j = \bar{1} \rightarrow q_j^{**} = 1, \quad q_j^* = 0$ WHERE, $(q_j = q_j^* - q_j^{**})$

DIVIDER FOR PERFORMING SIGNED DIVISION USING A REDUNDANT SIGNED DIGIT

BACKGROUND OF THE INVENTION

1. Field of the Invention

The present invention relates to a divider for performing signed division using a redundant signed digit (hereafter referred to as RSD).

2. Description of the Prior Art

The following is the brief description of the operation using RSD (Redundant Signed Digit).

In the RSD notation, the numeral X is expressed as the finite difference of two numerals x* and x**. That is, RSD is a numeral defined as follows:

$$X = \sum_{i=0}^{n} x_i \cdot 2^i = \sum_{i=0}^{n} (x_i^* - x_i^{**}) \cdot 2^i \quad (1)$$

Where, $x_i^*, x_i^{**} \epsilon (0,1)$

In this case, x1 definitely equals $x_i \epsilon$ (1,0, 1 (reversed)).

For an RSD-notation numeral, each digit takes three values of 1, 0, and 1 (reversed) (minus 1). For normal binary notation or complement-of-2 notation, the notation of a numeral has only one way. For the RSD notation, however, a plurality of notations are possible, in other words, there is redundancy. For example, the numeral 7 is expressed by four-digit RSD as {0111}, {1001 (reversed)}, (101 (reversed) 1}, and {11 (reversed) 11}.

Addition and subtraction between RSD-notation numeral X and normal unsigned binary number are described below. In this case, the following are assumed.

$$Y = \sum_{i=0}^{n} y_i \cdot 2^i = \sum_{i=0}^{n} (y_i^* - y_i^{**}) \cdot 2^i \quad (2)$$

Where, $y_i^*, y_i^{**} \epsilon (1,0)$ $$z = \sum_{i=0}^{n} z_i \cdot 2^i \quad (3)$$

Where, $z_i \epsilon (1,0)$

When assuming the sum of Y and Z as:

$$S = \sum_{i=1}^{n+1} s_i \cdot 2^i = \sum_{i=1}^{n+1} (s_i^* - s_{ii}^{**}) \cdot 2^i \quad (4)$$

Where, $s_i^*, s_{ii}^{**} \epsilon (1,0)$

And, when assuming the difference between Y and Z as:

$$D = \sum_{i=1}^{n+1} d_i \cdot 2^i = \sum_{i=1}^{n+1} (d_i^* - d_i^{**}) \cdot 2^i \quad (5)$$

Where, $d_i^*, d_i^{**} \epsilon (1,0)$

Each operation is performed as shown in FIGS. 4 and 5. In FIGS. 4 and 5, 1a to 1d are a full adder and a small circle represents reversal of input and output. FIG. 6 shows a truth table of the full adder.

Moreover, addition and subtraction between a numeral expressed by RSD and a numeral expressed by complement of 2 are described below.

FIG. 9 shows the addition between a numeral expressed by RSD and a numeral expressed by complement of 2. The result of the addition is obtained as a numeral expressed by RSD. In this case, Y is an augend expressed by RSD, Z is an addend expressed by complement of 2, and S is an addition result expressed by RSD. Y and S are shown by the above expressions (2) and (4); and the following is assumed:

$$z = -z_n \cdot 2^n + \sum_{i=0}^{n-1} z_i \cdot 2^i, \text{ where } z_i \epsilon(1, 0)$$

In FIG. 9, 1a to 1e are a type of generalized full adders. FIG. 10 shows a truth table of the full adder.

FIG. 11 shows the subtraction between a numeral expressed by RSD and a numeral expressed by complement of 2. The result of this subtraction is obtained as a numeral expressed by RSD. In this case, Y is a minuend expressed by RSD, Z is a subtrahend expressed by complement of 2, and S is a subtraction result expressed by RSD.

The following is the description of addition of "72+21 =93" and subtraction of "72−21=51". Because 72 equals 11 (reversed) 011 (reversed) 000 (RSD notation), 93 is obtained as an addition result through the operation shown in FIG. 12 and 51 is obtained as an subtraction result through the operation shown in FIG. 13. From FIGS. 12 and 13, it is found that addition or subtraction between a numeral expressed by RSD and a numeral expressed by complement of 2 can be executed for the same time as the delay of full adder because carrier propagation is unnecessary.

The following is the description of division. The division between a numeral expressed by RSD and a numeral expressed by complement of 2 is, in a word, the irreparable-type division using RSD notation for a dividend and complement-of-2 notation for a divisor. For the irreparable-type division, there is a little degree of freedom in selection of quotient digit. Therefore, when considering that the quotient digit can be determined at a high speed, it is significant to use numerals expressed by RSD in order to perform high-speed addition and subtraction.

The following is the description of the algorithm for division between a numeral expressed by RSD and a numeral expressed by complement of 2.

For the irreparable-type division, the quotient digit "qj" is selected among 1 and 1 (reversed) so that the following expressions (6) and (7) are satisfied.

$$R^{j+1} = 2 \cdot (R^j - q_j D) \quad (6)$$

$$-2|D| < R^{j+1} < 2|D| \qquad (7)$$

In this case, Rj is partial remainder and D is a divisor qj is the j-th digit of a quotient. For the division in accordance with RSD, the dividend $R^0$ is expressed by RSD and the divisor D is expressed by complement of 2. That is, $R^0$ and D are expressed as follows:

$$R^0 = \sum_{i=0}^{n+m} r_i^0 \cdot 2^{-i} = \sum_{i=0}^{n+m} (r_i^{0*} - r_i^{0**}) \cdot 2^{-i} \qquad (8)$$

Where, $$r_0^0 = 0, \; r_i^0 \epsilon(1,0,\bar{1}), \; r_i^{0*}, \; r_i^{0**} \epsilon(1,0)$$

$$D = -2^0 \cdot d_0 + \sum_{i=1}^{n} d_i \cdot 2^{-i} \qquad (9)$$

Where, $$d_0 \neq d_i, \; d_i \epsilon(0,1)$$

Moreover, the j-th digit "qj" of the quotient is selected as shown in the truth table in FIG. 7 so as to meet the above expressions (6) and (7) and the following expression.

$$R^{j+1} = \sum_{i=0}^{n+m-j} r_i^{j+1} \cdot 2^{-i} = \sum_{i=0}^{n+m-j} (r_i^{j+1*} - r_i^{j+1**}) \cdot 2^{-i} \qquad (10)$$

Where, $$r_i^{j+1} \epsilon(1,0,\bar{1}), r_i^{j+1*}, \; r_i^{j+1**} \epsilon(1,0)$$

Though 0 and 0 (reversed) are equal as a numerical value, they differ in their corresponding operations.

The following is the description of the above division algorithm. For the division between a numeral expressed by RSD and a numeral expressed by complement of 2, the dividend $R^0$ and the divisor D are expressed as shown in the above expressions (8) and (9) (however, $r_0^0 = 0$ $0^r$, $r_0^{0**} = 0$, $d_0 \neq d_1$ and the quotient digit "qj" is selected among 1, 0, 0 (reversed), and 1 (reversed). Though 0 (reversed) is the same as 0, they differ in their corresponding operations. FIG. 14 shows the operation corresponding to each quotient digit. To meet the above expression (10) through the operation, $r_i^{j+1}$ must be equal to 0 or $r_i^{j+1*}$ must be equal to $r_i^{j+1**}$ when "i" is smaller than 0. To make the above condition effective, it is only necessary to select the quotient digit "qj" in accordance with the high-order three bits of $R^j$—$r_0^j$, and $r_1^j$, and $r_2^j$ or $r_0^{j*}$, $r_0^{j**}$, $r_1^{j*}$, $r_1^{j**}$, $r_2^{j*}$, and $r_2^{j**}$. FIG. 15 shows a decision table for the above selection. In the decision table, $r_0$, $r_1$, and $r_2$ shows the high-order three bits of $R^j$ and "qj" shows the quotient digit to be selected.

As described above, the division between a numeral expressed by RSD and a numeral expressed by complement of 2 may be executed at a very high speed when considering that the quotient digit in each cycle can be determined only by checking the high-order three bits of partial remainder and the operation does not require carry propagation.

The following is the description of an existing divider for performing division in accordance with the above RSD by referring to FIG. 16. In FIG. 16, numerals 2 and 3 are an (n+1)-bit register, 4 and 5 are an (n+1)-bit data latch, 6 is an (n+1)-bit register, 7 is a selector, 8 is an adder, 9 and 10 are an m-bit shift register, 11 and 12 are a shifter, 13 is a bit processing means for outputting the quotient digit $r_n^*$ and the selection signal SEL for the selector in accordance with the truth table in FIG. 7 depending on the contents of respective high-order three bits of the registers 2 and 3 and the contents of the most significant bit of the register 6, 14 is a quotient digit determining means for determining the quotient digit when respective high-order three bits of the registers 2 and 3 and the most significant bit of the register 6 are set to "0" in accordance with the truth table in FIG. 7, 15 is a quotient digit correcting means for correcting the output of the quotient digit determining means depending on the contents of the most significant bit of the register 6, and 16 and 17 are a shift register for storing quotient digits.

The outputs of the registers 2 and 3 are input to the data latches 4 and 5 respectively through (n+1) electric switches not illustrated. The selector 7 outputs a signal in which all bits of the output of the register 6 are 1, a signal in which all bits of it are 0, or a signal in which all bits of it are reversed by selecting it with the selection signal SEL. The shifters 11 and 12 receive the outputs of the shift registers 9 and 10 as the least significant bit respectively and shift the output of the adder 8 by one bit in the direction of the most significant bit. The outputs of the shifters 11 and 12 are input to the registers 2 and 3 respectively through (n+1) electric switches not illustrated.

The following is the description of the operation of the existing divider. For easy understanding of the description of the operation, it is assumed that the dividend R is divided into $R^{**}$ and $R^*$, high-order (n+1) bits of $R^{**}$ and $R^*$ are stored in the registers 2 and 3 respectively, low-order m bits of them are stored in the shift registers 9 and 10 respectively, and the divisor D is stored in the register 6.

First, the contents of the high-order (n+1) bits of $R^{**}$ and those of the high-order (n+1) bits of $R^*$ which are stored in the registers 2 and 3 respectively are sent to and held by the data latches 4 and 5. At the same time, the contents of the high-order three bits of $R^{**}$ and those of the high-order three bits of $R^*$ are sent to the bit processing means. The quotient determining means 14 decodes these 6 bits to determine a quotient digit for D>0 in accordance with the truth table in FIG. 7. The quotient digit correcting means 15 receives the quotient digit to correct it to "1 (reversed)" if the quotient digit is "1" for D<0 and to "1 (reversed)" if it is 1 (reversed) for D<0. The bit processing means 13 determines $r_n^*$ in accordance with the quotient digits $q^{**}$ and $q^*$ corrected by the quotient digit correcting means 15, outputs $q^{**}$ and $q^*$ to the shift registers 16 and 17 respectively and also to the selector 7 as the selection signal SEL, and outputs $r_n^*$ to the adder 8. The selector 7 selects an input among four operations in FIG. 8 by the selection signal SEL so that the operation performed by the adder 8 corresponds to the contents of quotient digit and outputs the input to the adder 8. The adder 8 executes any one of the operations in FIG. 8 by the (n+1)-bit RSD-notation numeral expressed by the high-order (n+1) bits of $R^{**}$ and $R^*$ held by the data latches 4 and 5, the output of the selector 7, and $r_n^*$ outputt by the bit processing means 13. For the operation result, the following expression is always effected.

$$r_{-2}^{**} = r_{-2}^{*}, \; r_{-1}^{**} = r_{-1}^{*} \qquad (11)$$

Remaining $r_0^{}$ to $r_{n-1}^{}$ and $r_0^*$ through $r_{n-1}^*$ are input to the shifters 11 and 12 respectively. The outputs of the shift registers 9 and 10 are input to the shifters 11 and 12 respectively as the least significant bit. These are added with $r_0^{}$ to $r_{n-1}^{}$ and $r_0^*$ to $r_{n-1}^{**}$ to serve as the inputs of the registers 2 and 3.

By assuming the above operation as one cycle, quotients are obtained in the shift registers 16 and 17 after (m+1) cycles are executed. Remainders are stored in the registers 2 and 3 by shifting one bit to the left.

Problem to Be Solved by the Invention

The division using RSD has the advantage that very high-speed control clocks can be used compared with the division using no RSD because carrier propagation is unnecessary in an adder. However, because the existing divider using RSD is constituted as described above, the selection signal to the selector 7 should correct the quotient digit determined by the quotient digit determining means 14 by the quotient digit correcting means 15. Therefore, many stages of transistors are necessary until the selection signal for the selector 7 is obtained. This is a disadvantageous factor for increasing the control block frequency.

SUMMARY OF THE INVENTION

Object

The present invention is made to solve the above problem and its object is to provide a divider capable of using a quotient digit determined by a quotient digit determining means as the selection signal for a selector without correcting the quotient digit and decreasing the number of stages of transistors necessary to obtain the selection signal.

Means for Solving the Problem

The divider of the present invention comprises a quotient determining means 14 for determining quotient digit from the dividend or a particular part of partial remainder, a quotient digit correcting means 15 for applying predetermined correction to the quotient digit determined by the quotient digit determining means 14 in accordance with the sign of a divisor, and a divisor reversing means 18 for receiving the divisor and inputting it to a selector 7 to select a numeral for adding the divisor to the dividend or partial remainder through an adder 8 by reversing all bits of the divisor when the sign of the divisor is negative; in which the quotient digit determined by the quotient digit determining means 14 is used as a selection signal for controlling the selector.

Function

The divisor reversing means 18 receives a divisor and inputs it to a selector 7 to select a numeral for adding the divisor to the dividend or partial remainder through an adder 8 by reversing all bits of the divisor when the sign of the divisor is negative. The selection signal for the selector 7 uses the quotient digit determined by the quotient digit determining means 14. Therefore, even if the sign of the divisor is negative, the selection signal for the selector 7 can be obtained without using the quotient digit determined by the quotient digit correcting means 15.

The above and other objects, features, and advantages of the invention will become more apparent from the following description when taken in conjunction with the accompanying drawings.

BRIEF DESCRIPTION OF THE DRAWINGS

FIG. 7 shows a decision table for division using RSD;

FIGS. 8(a), 8(b), 8(c) and 8(d) show the operation contents for each value of the quotient digit of division using RSD;

FIG. 9 shows the addition between a numeral expressed by RSD and a numeral expressed by complement of 2;

FIG. 10 shows a truth table of a full adder;

FIG. 11 shows the subtraction between a numeral expressed by RSD and a numeral expressed by complement of 2;

FIG. 15 shows a decision table; and

DESCRIPTION OF THE PREFERRED EMBODIMENT

[Embodiment]

Figure 1:
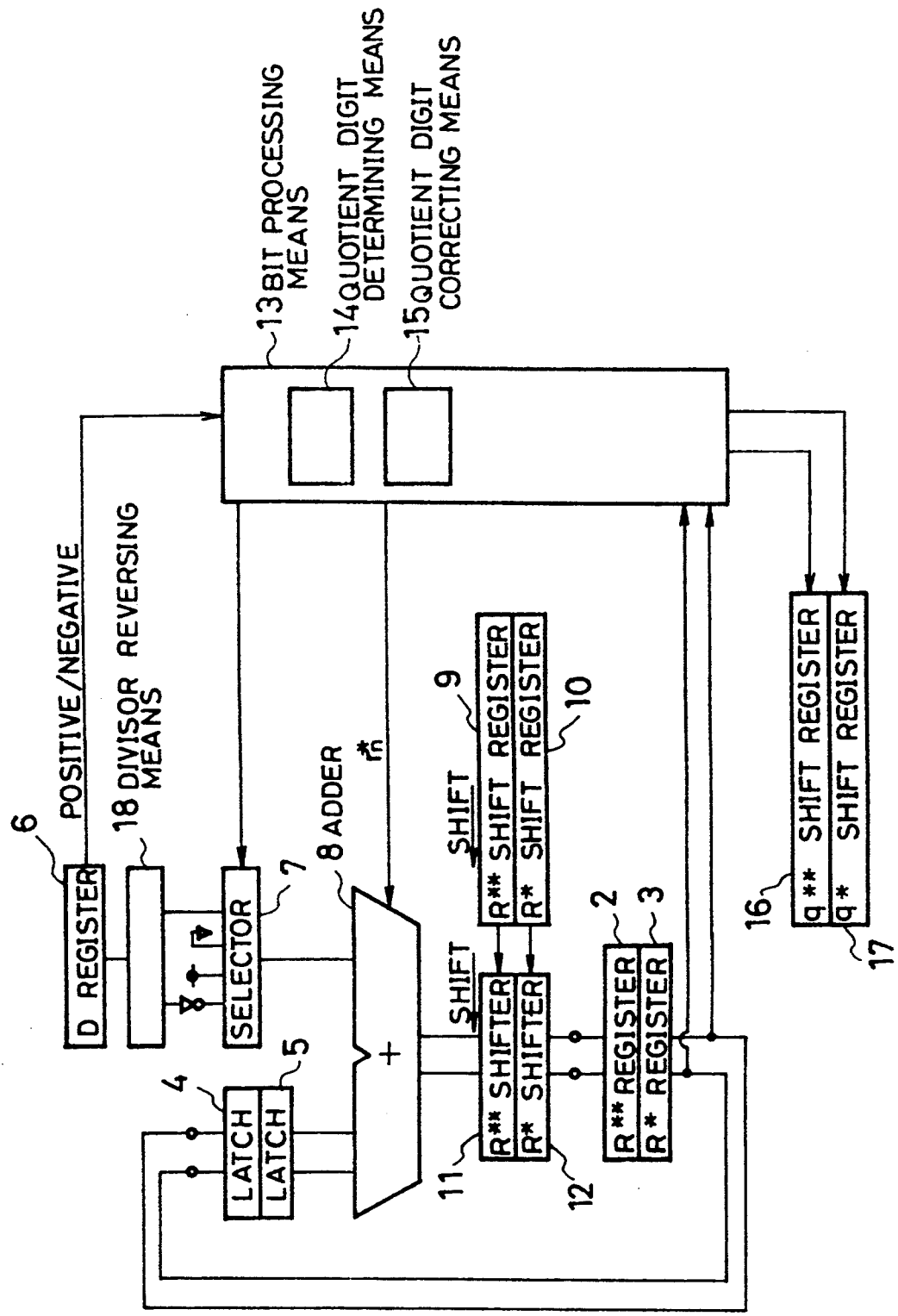
FIG. 1 is a block diagram showing the constitution of the divider related to an embodiment of the present invention.
Figure 3:
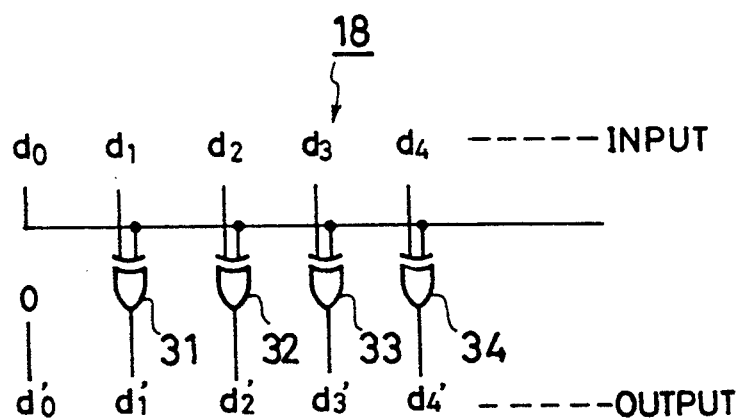
FIG. 3 is a circuit block diagram of the divisor reversing means in this embodiment.
Figure 4:
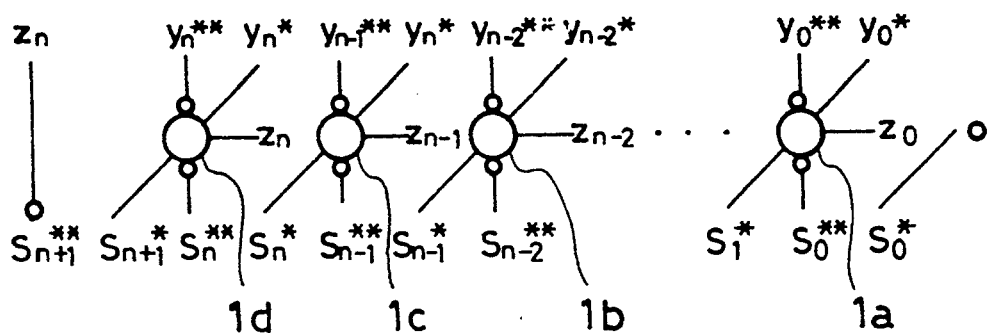
FIG. 4 is a diagram showing the addition between a numeral expressed by RSD and a unsigned binary number.
Figure 5:
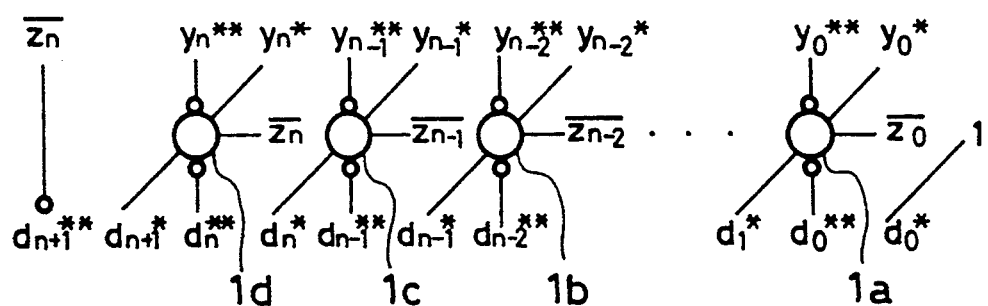
FIG. 5 is a diagram showing the subtraction between a numeral expressed by RSD and a unsigned binary number.
Figure 6:
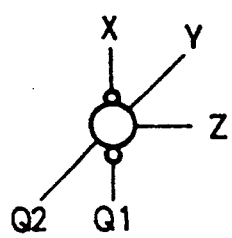
FIG. 6 shows a truth table of the full adder used for the addition between a numeral expressed by RSD and a unsigned binary number.
Figure 12:
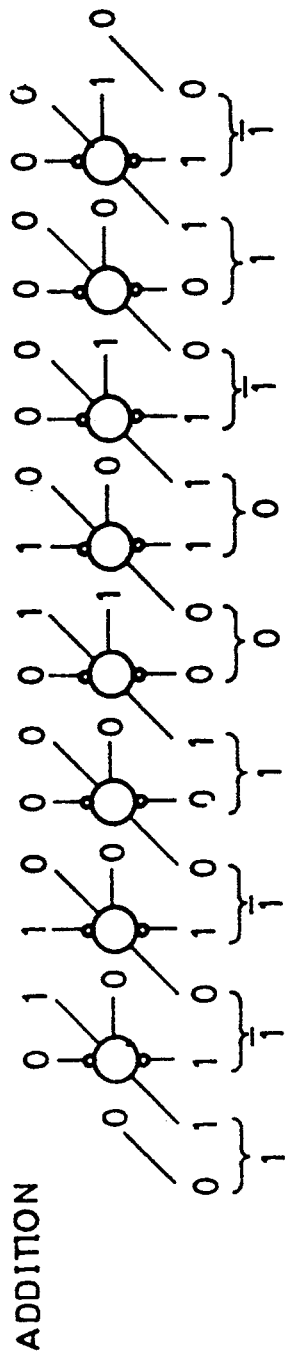
FIG. 12 shows the addition between an actual numeral expressed by RSD and a numeral expressed by complement of 2.
Figure 13:
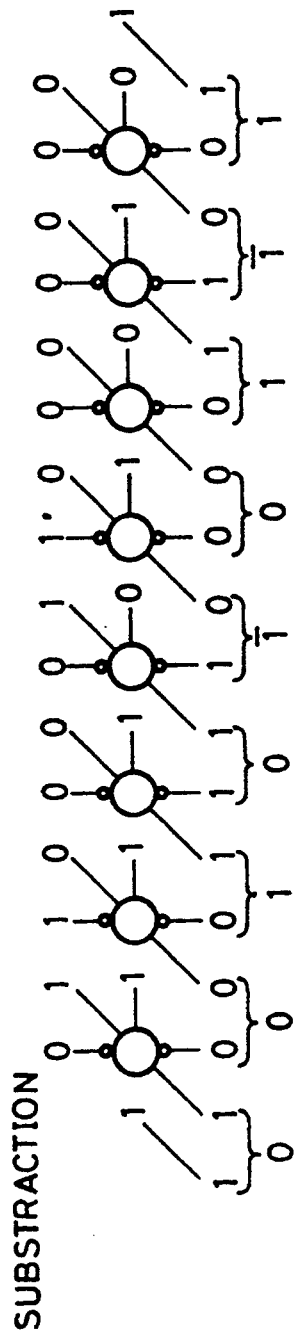
FIG. 13 shows the subtraction between an actual numeral expressed by RSD and a numeral expressed by complement of 2.
Figure 14:
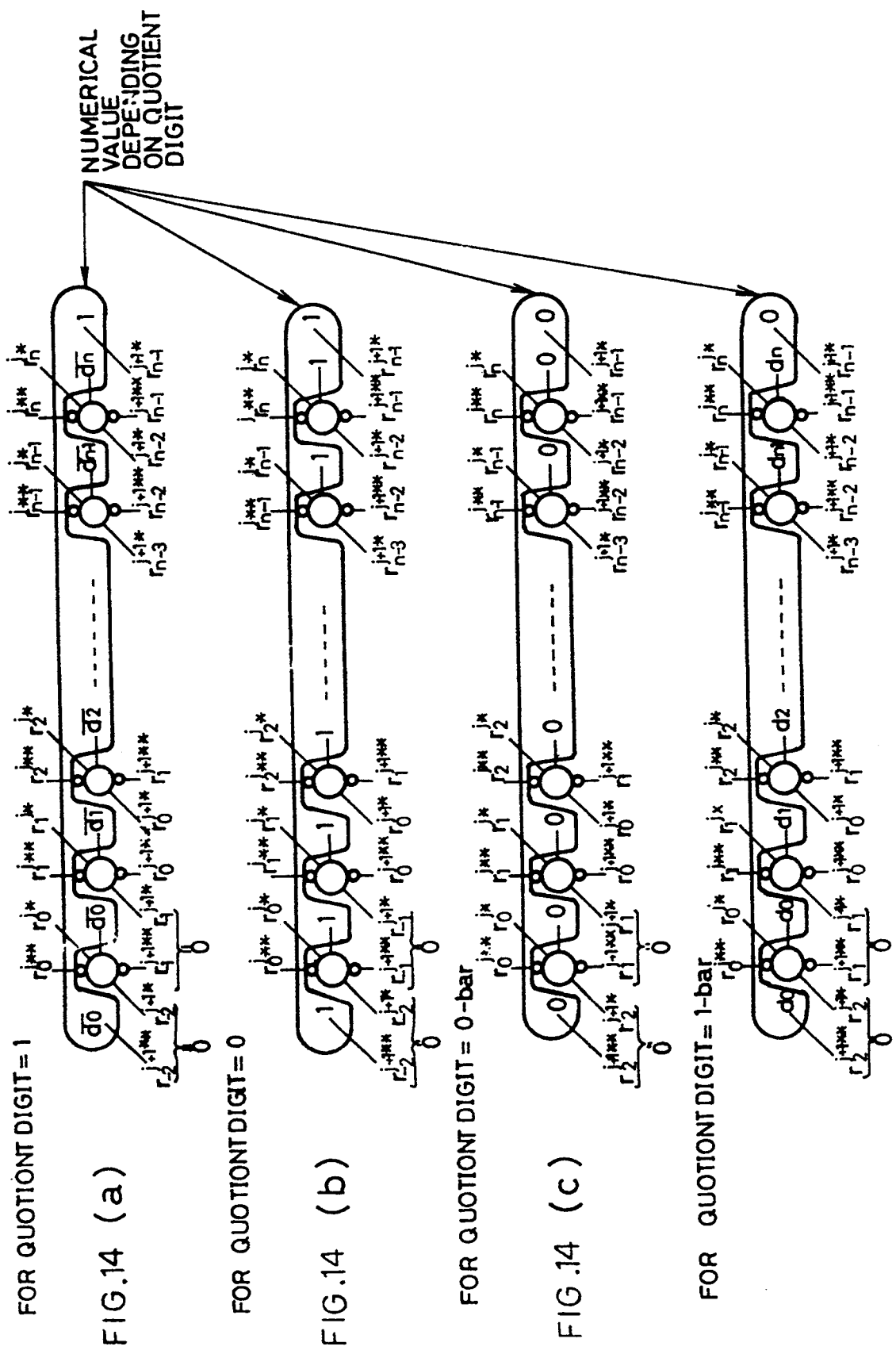
FIGS. 14(a), 14(b) and 14(c) show the operation corresponding to each quotient digit.
Figure 16:
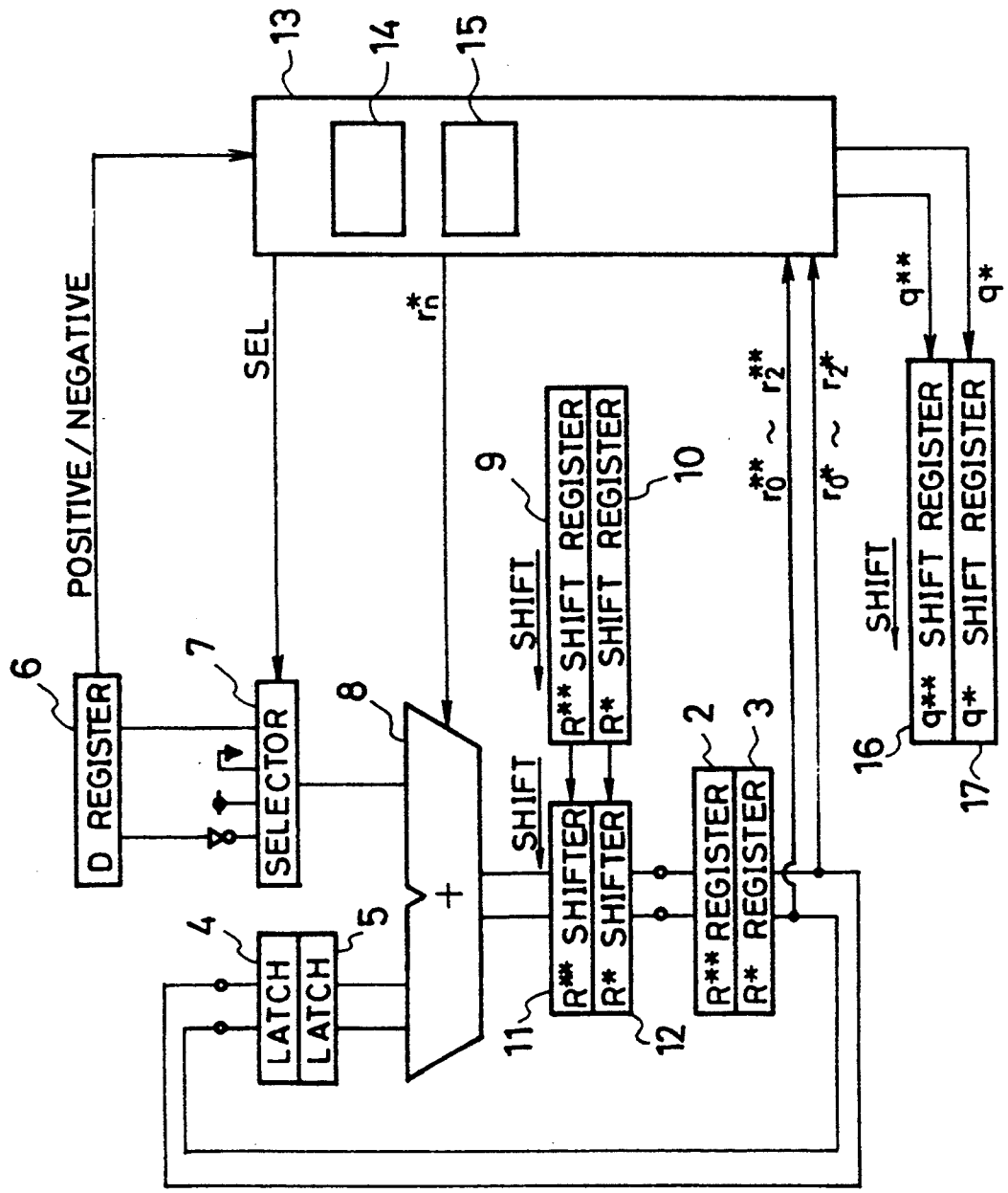
FIG. 16 is a block diagram showing the constitution of an existing divider.

FIG. 1 is a block diagram showing the constitution of the divider related to an embodiment of the present invention. In FIG. 1, the components corresponding to those in FIG. 16 are provided with the same sign and their description is omitted. Numeral 18 in FIG. 1 is a divisor reversing means for receiving a divisor and inputting it to the selector 7 to select a numeral to be added to a dividend or partial remainder through the adder 8 by reversing all bits of the divisor when the divisor is negative. The divisor reversing means 18 directly outputs the contents of the register 6 when the contents of the most significant bit of the register 6 are "0" and outputs the contents of the register 6 by reversing all bits of the register 6 when the contents of the most significant bit of the register 6 are "1". The divisor reversing means 18 consists of the exclusive OR gates 31 to 34 for inputting the divisors d0 to d4 as shown in FIG. 3. The selector 7 selects a signal in which all bits of the output of the divisor reversing means 18 are 1, a signal in which all bits of it are 0, or a signal in which all bits of it are reversed to the adder 8 by selecting it with the selection signal using the output of the quotient digit determining means 14. That is, the selector 7 selects and outputs a numeral to be added to a dividend or partial remainder.

The following is the description of the operation of the embodiment. For easy understanding of the description of the operation, it is assumed that the dividend R is divided into R** and R*, high-order (n+1) bits of R** and R* are stored in the registers 2 and 3 respectively, low-order m bits of them are stored in the shift registers 9 and 10 respectively, and the divisor D is stored in the register 6.

First, the contents of the high-order (n+1) bits of R** and those of the high-order (n+1) bits of R* which are stored in the registers 2 and 3 respectively are sent to and held by the data latches 4 and 5. At the same time, the contents of the high-order three bits of R** and those of the high-order three bits of R* are sent to the bit processing means. The quotient determining means 14 decodes these 6 bits to determine a quotient digit for D>0 in accordance with the truth table in FIG. 7. The quotient digit serves as the selection signal for the selector 7. For D <0, the selection signal comes to "1 (reversed)" when the correct quotient digit is "1". For D<0, however, all bits of the contents of the register 6 are reversed by the divisor reversing means 18 and input to the selector 7. Therefore, no problem occurs. The quotient digit correcting means 15 receives the quotient digit output by the quotient digit determining means 14 to correct it to "1 (reversed)" when the quotient digit is "1" and to "1" when the quotient digit is "1 (reversed)". The bit processing means 13 determines $r_n^*$ in accordance with the corrected $q^{**}$ and $q^*$ and outputs $q^{**}$ and $q^*$ to the shift register 16 and 17 respectively and $r_n^*$ to the adder 8. The selector 7 selects an input among four operations in FIG. 8 so that the operation performed by the adder 8 corresponds to the contents of quotient digit and outputs it to the adder 8.

The adder 8 executes any one of the operations in FIG. 8 by the (n+1)-bit RSD-notation numeral expressed by the high-order (n+1) bits of R** and R* held by the data latches 4 and 5, the output of the selector 7, and "$r_n$" outputted by the bit processing means 13. For the operation result, the following expression is always effected.

$$r_{-2}^{**} = r_{-2}^*, \quad r_{-1}^{**} = r_{-1}^*$$

Remaining $r_0^{}$ to $r_{n-1}^{}$ and $r_0^*$ through $r_{n-1}^*$ are input to the shifters 11 and 12 respectively. The outputs of the shift registers 9 and 10 are input to the shifters 11 and 12 respectively as the least significant bit. These are added with $r_0^{}$ to $r_{n-1}^{}$ and $r_0^*$ to $r_{n-1}^{**}$ to serve as the inputs of the registers 2 and 3.

By assuming the above operation as one cycle, quotients are obtained in the shift registers 16 and 17 after (m+1) cycles are executed. Remainders are stored in the registers 2 and 3 by shifting one bit to the left.

The following is supplementary explanation. It is assumed that the above quotient digit determining means 14 has only a quotient digit determining table (or decoder) for D (divisor) >0. Therefore, the quotient digit determining table outputs the quotient digit "qj" for D>0 to, for example, the high-order three bits r0, r1, and r2 of the inputted dividend or partial remainder regardless of whether D is positive or negative. Therefore, it is necessary to correct the quotient digit for D<0 as shown below.

For $qj = qj^{**} - qj^*$;
$(qj^{**}, qj^*) = (0, 1) \rightarrow (1, 0)$ or $1\Delta1$ (reversed)
$(qj^{**}, qj^*) = (1, 1) \rightarrow (1, 1)$ or $0\Delta0$
$(qj^{**}, qj^*) = (0, 0) \rightarrow (0,0)$ or 0 (reversed)$\rightarrow$0 (reversed)
$(qj^{**}, qj^*) = (1, 0) \rightarrow (0, 1)$ or 1 (reversed)$\rightarrow$1

However, a numeral to be input to the adder 8 takes the following values for the corrected quotient.

For qj=1: $d_0$ (reversed) $d_1$ (reversed) $d_2$ (reversed)... $d_n$ (reversed), and 1 as $r_n^*$ For qj=0: 1 1 1 ... 1 and 1 as $r_n^*$ For qj=1 (reversed): 0 0 0 ... 0 and 0 as $r_n^*$ For qj=1 (reversed): $d_0 d_1 d_2 ... d_n$ and 0 as $r_n^*$ Therefore, by previously reversing D ($d_0 d_1 ... d_n$) for D<0, it is possible to select $d_0$ (reversed) $d_1$ (reversed) ... $d_n$ (reversed)/111 ... 1/000 ... 0/$d_0 d_1 ... d_n$ in accordance with the quotient digit before correction.

It is also possible to use $qj^{**}$ before correction for "$r_n$". Thus, a numeral to be input can be determined at a high speed because the quotient digit before correction can be used as the selection signal.

Figure 2:
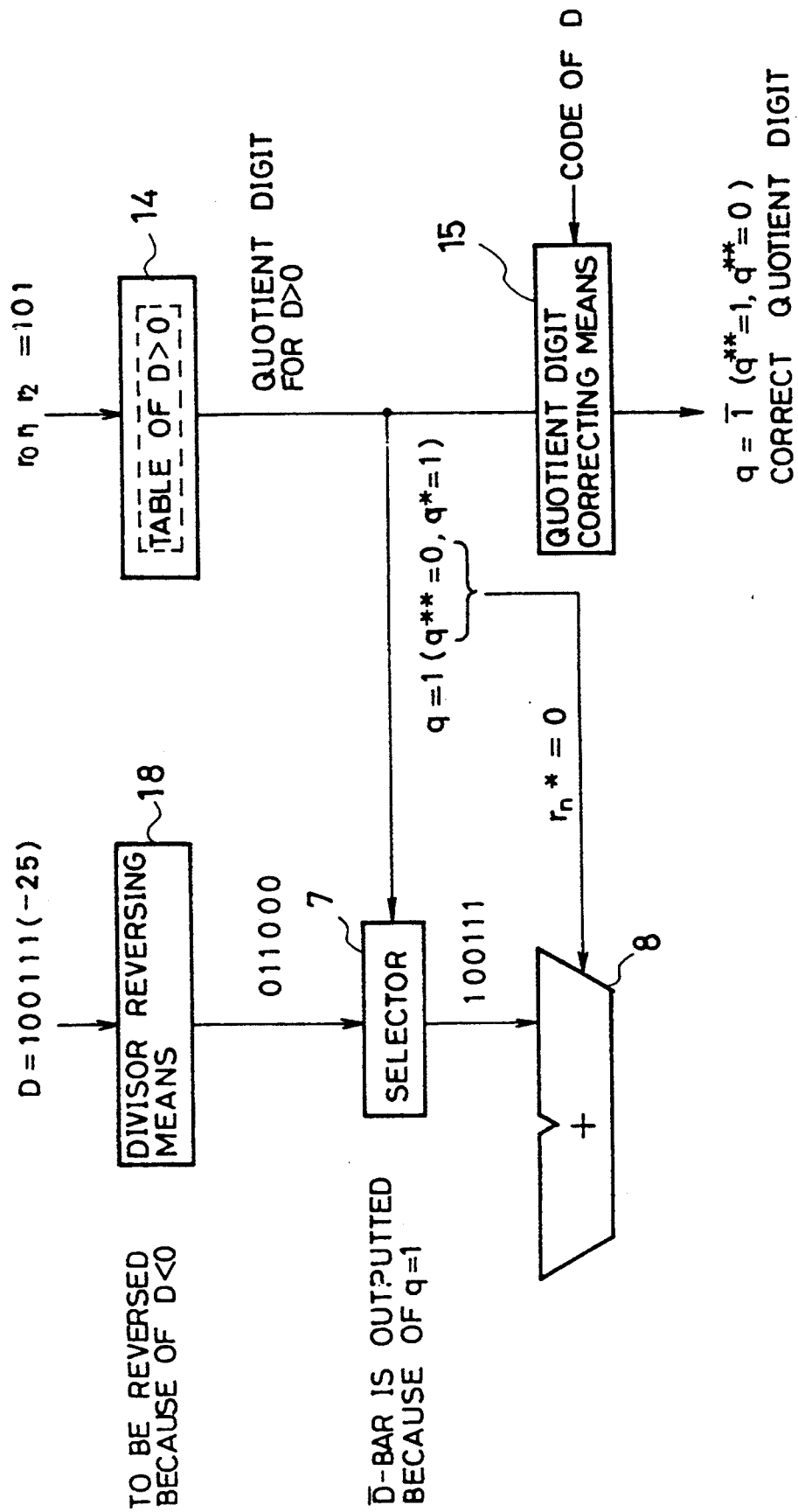
FIG. 2 is a diagram for explaining the flow of an actual divisor and dividend used for this embodiment.

For D = 100111 (−25) and $r_0 r_1 r_2$ = 101, for example, processing is executed as shown in FIG. 2. That is, the divisor reversing means 18 inputs "100111" to reverse it and outputs "011000". The quotient digit determining means 14 inputs "101" and outputs the quotient digit for d>0. The selector 7 selects "100111" in accordance with the quotient digit to give it to the adder 8.

Moreover, the quotient digit determining means 14 can also be realized by a ROM storing a quotient digit determining table.

Advantage of Invention

As described above, the present invention makes it possible to generate a selection signal for a selector regardless of the sign of a divisor and thereby decrease the number of stages of transistors required for generation of the selection signal because a divisor reversing means for generating an input for a selector to select a numeral to be added to a dividend or partial remainder by reversing all bits of the divisor when the sign of the divisor is negative. Therefore, it is possible to improve the frequency of control clock and provide a divider performing high-speed operation.

Moreover, because the quotient digit correcting means receives a quotient digit from the quotient digit determining means and correct the quotient digit to a complement when a divisor is negative, division can be performed even for a negative divisor at a high speed similarly to the case of a positive divisor.

Also, because the divisor reversing means comprises exclusive OR gates for inputting a divisor, the circuit is simplified and the above advantage can be achieved.

Furthermore, because the selector selects a signal in which all bits of the output of the divisor reversing means are 1, a signal in which all bits of it are 0, or a signal in which all bits of it are reversed by the selection signal consisting of the quotient digit from the quotient digit determining means, it is possible to input even a negative divisor to an adder similarly to the case of a positive divisor. Therefore, the above advantage can be achieved.

What is claimed is:

1. A divider for performing division between a numeral expressed as at least one redundant signed digit and a divisor expressed as a signed binary number, comprising:

a quotient determining means for determining a quotient digit from the numeral;

a quotient digit correcting means for applying predetermined correction to the quotient digit according to the sign of the divisor;

a divisor reversing means for receiving the divisor and performing one of:
- (a) reversing all bits of the divisor when the sign of the divisor is negative;
- (b) outputting all bits of the divisor as "1";
- (c) outputting all bits of the divisor as "0";

a selector, coupled to said divisor reversing means and coupled to receive said quotient digit, to select one of (a), (b) or (c) above as a divisor output of said divisor reversing means, wherein said quotient digit is used by said selector as a selector signal to control selection of (a), (b) or (c); and an adder, coupled to receive said divisor output, for adding said divisor output of said divisor reversing means to the numeral.

2. A divider according to claim 1, wherein the quotient digit correcting means receives the quotient digit from the quotient digit determining means to correct the quotient digit to a complement when the divisor is negative.

3. A divider according to claim 1, wherein the divisor reversing means comprises an exclusive OR gate for inputting the divisor.

4. A divider according to claim 1, wherein the selector selects a signal in which all bits of the output of the divisor reversing means are 1, a signal in which all bits of it are 0, or a signal in which all bits of the output of the divisor reversing means are reversed.

* * * * *